Figure 20:
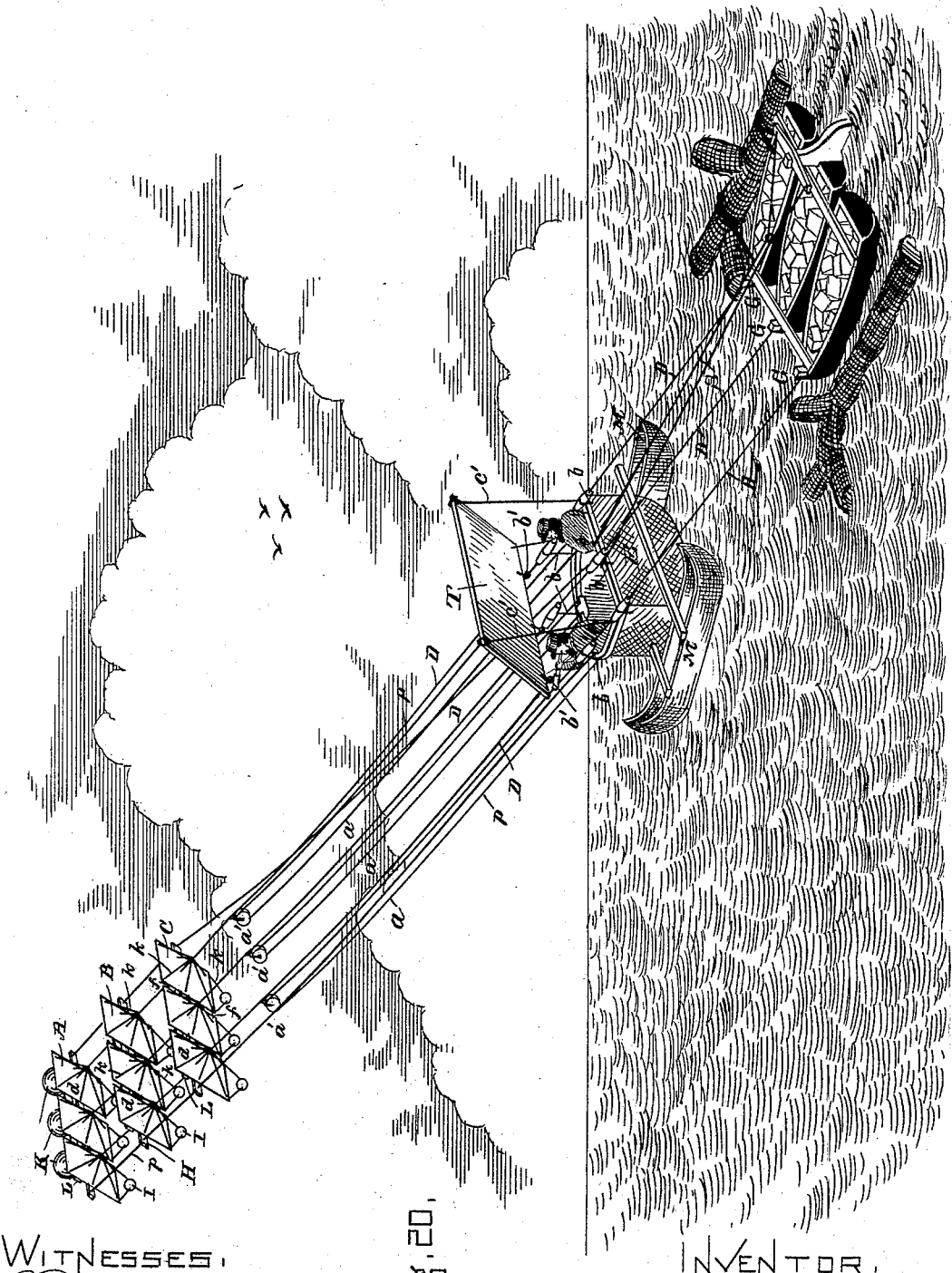

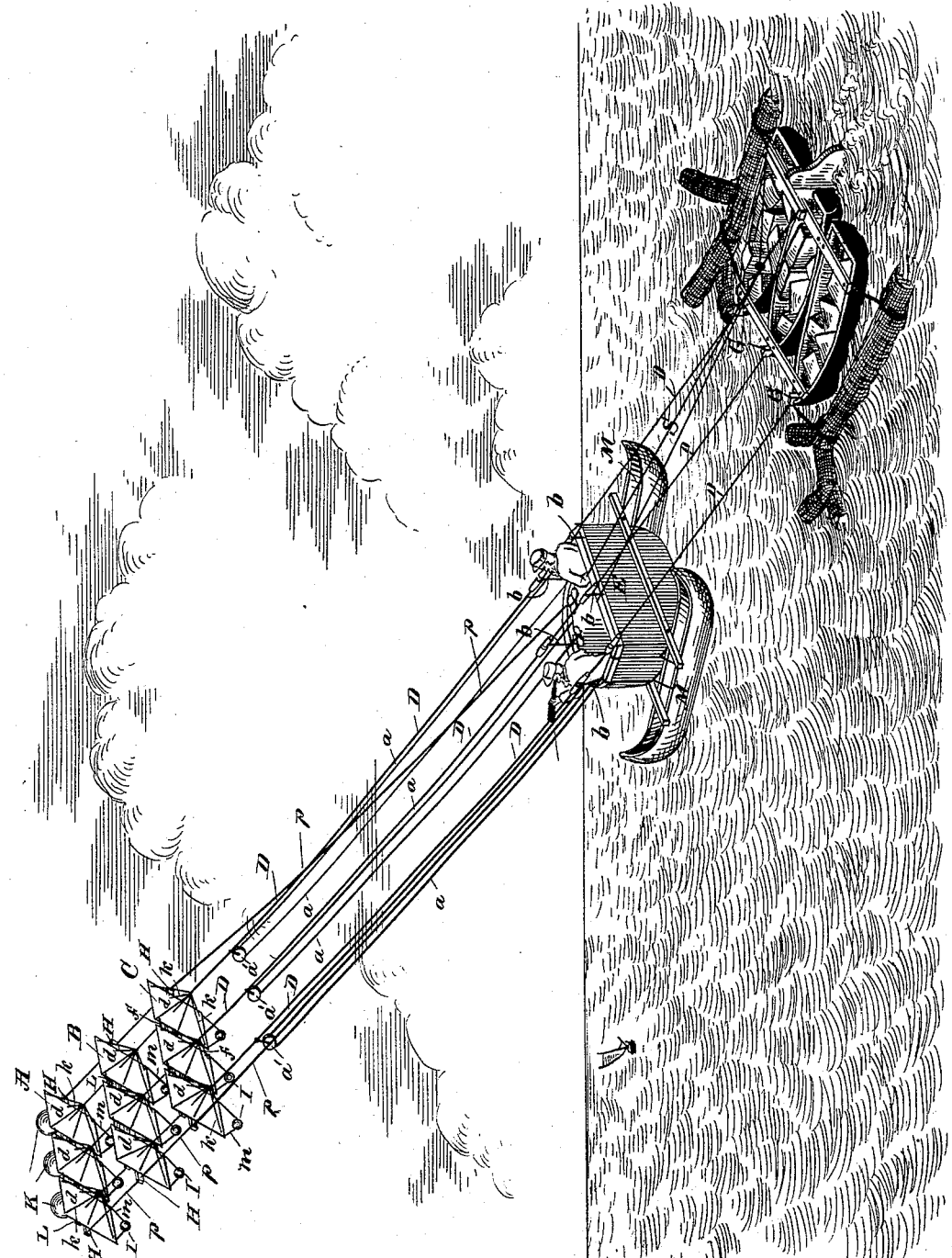

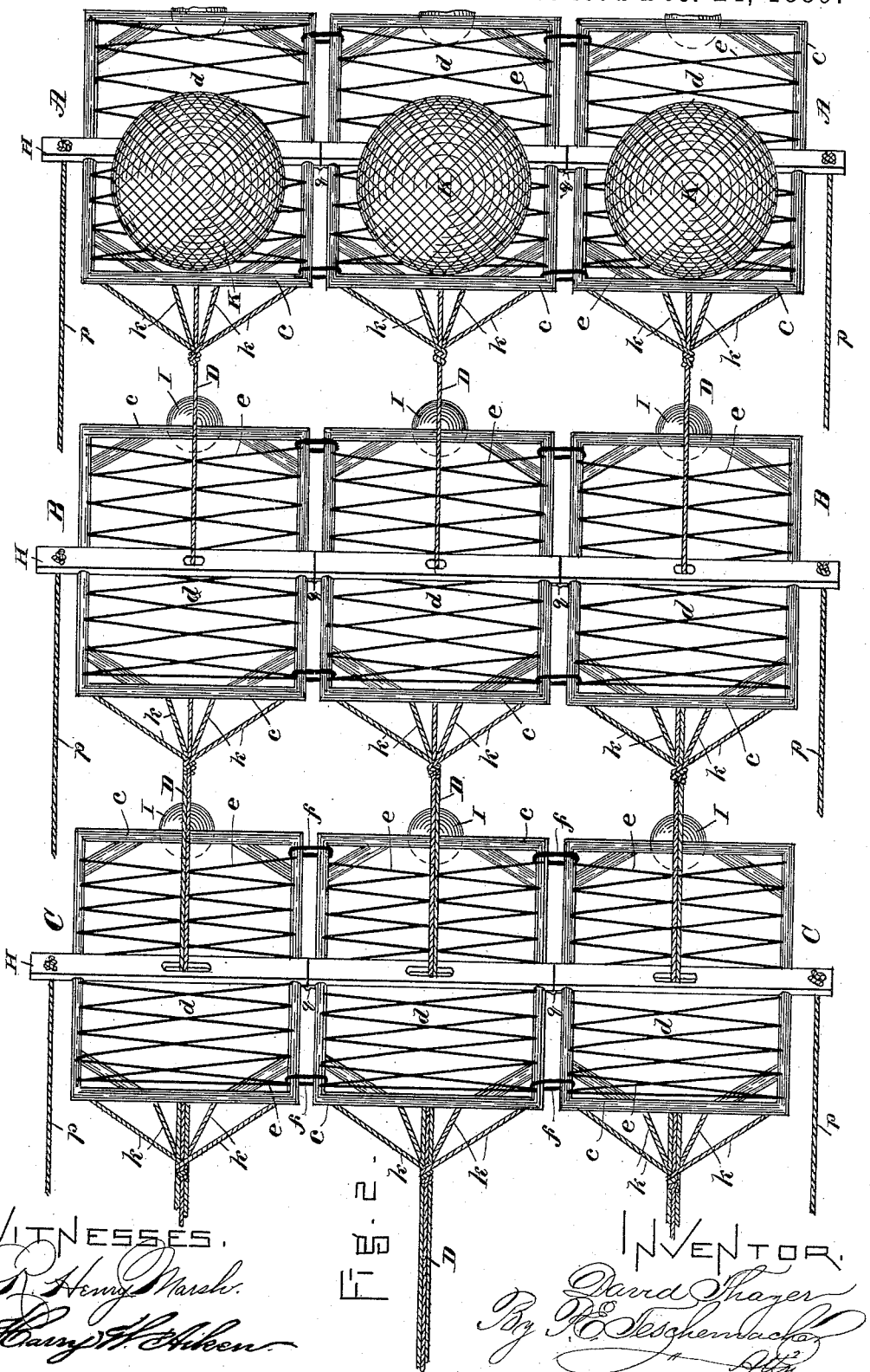

(No Model.)  10 Sheets—Sheet 3.
D. THAYER.
AERIAL APPARATUS.
No. 417,755. Patented Dec. 24, 1889.
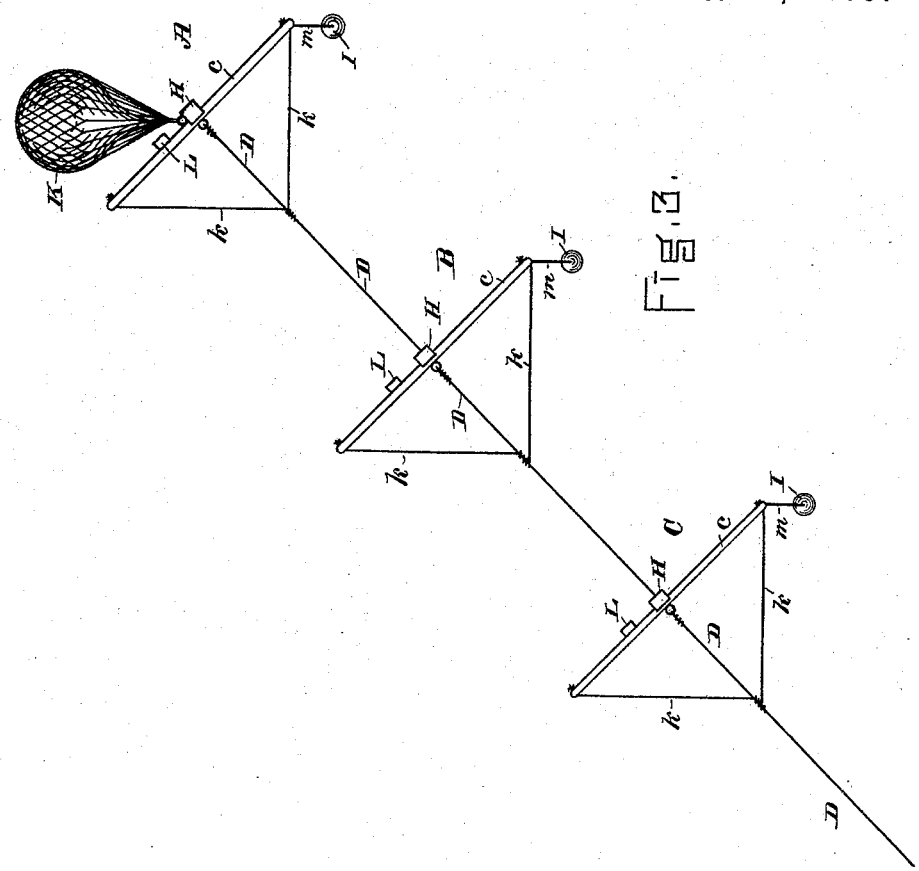
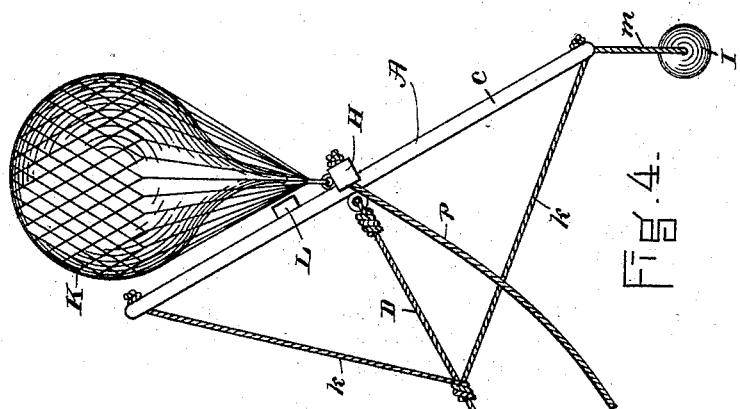
WITNESSES:
R Henry March
Harry W. Aiken
INVENTOR
David Thayer
By H. E. Teschemacher
Atty (No Model.) 10 Sheets—Sheet 4.
D. THAYER.
AERIAL APPARATUS.
No. 417,755. Patented Dec. 24, 1889.
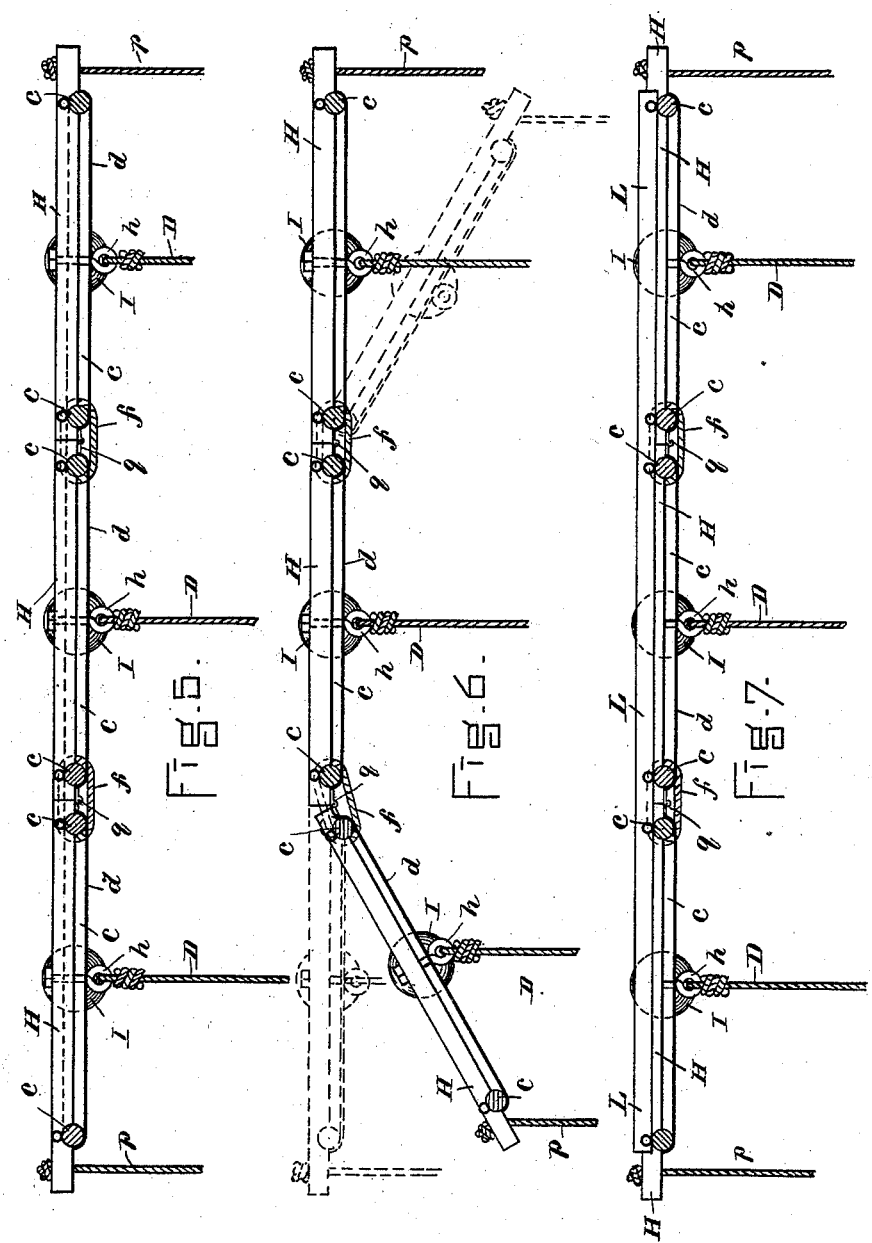
Witnesses,
Henry Marsh.
Harry H. Aiken
Inventor,
David Thayer
By Teschemacher
Atty (No Model.)   10 Sheets—Sheet 5.
D. THAYER.
AERIAL APPARATUS.
No. 417,755.   Patented Dec. 24, 1889.
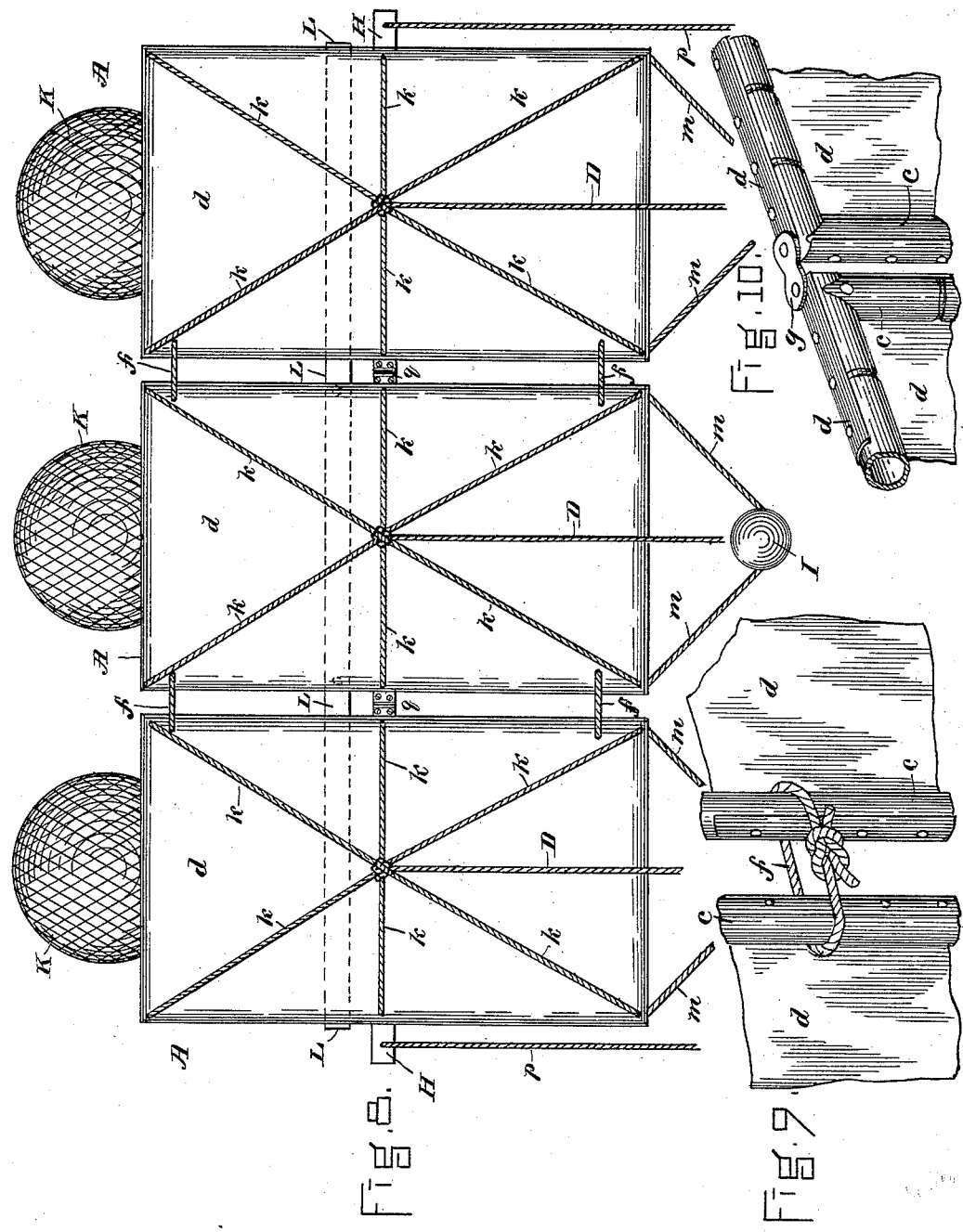

(No Model.) 10 Sheets—Sheet 6.
D. THAYER.
AERIAL APPARATUS.
No. 417,755. Patented Dec. 24, 1889.
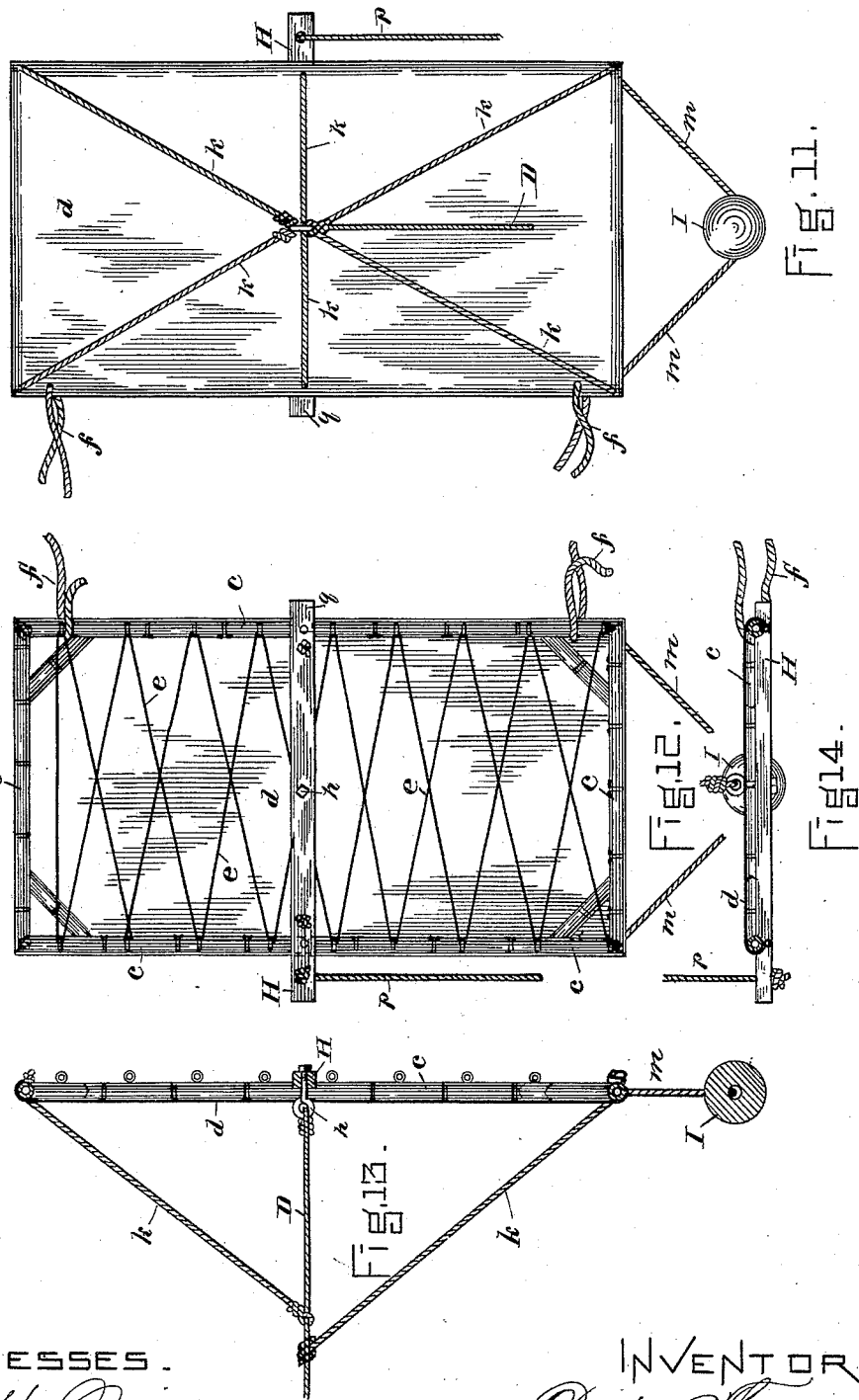

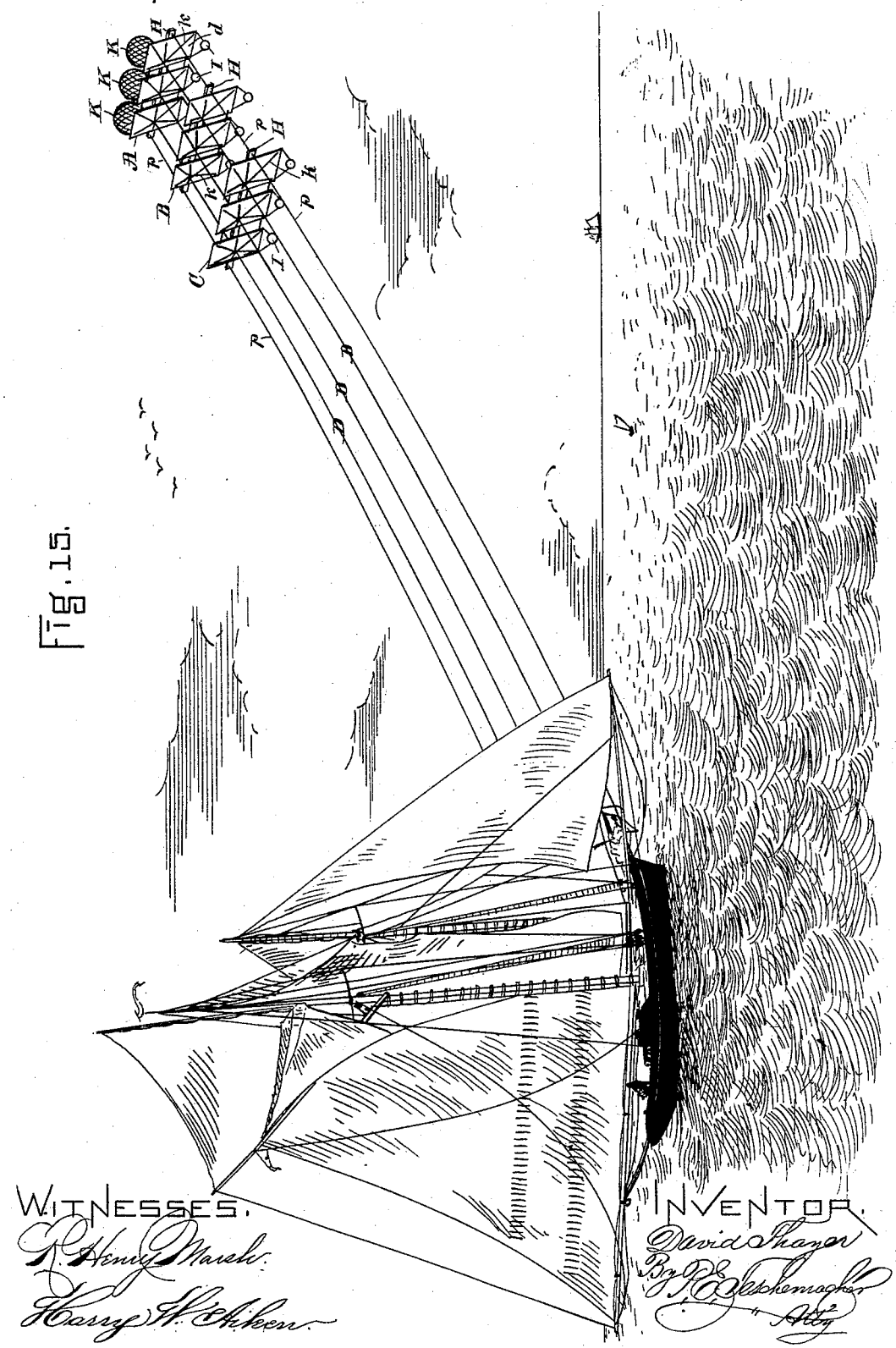

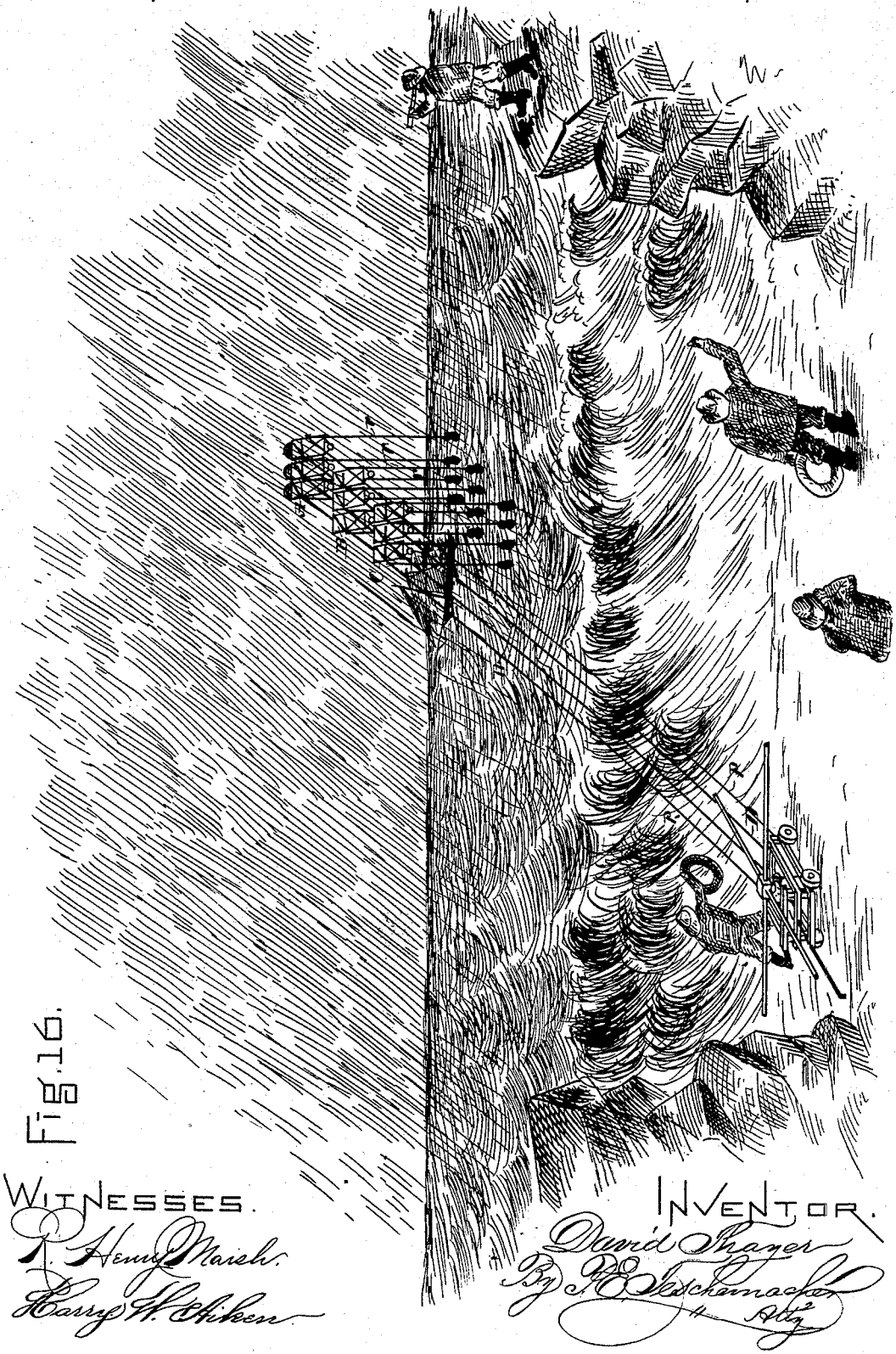

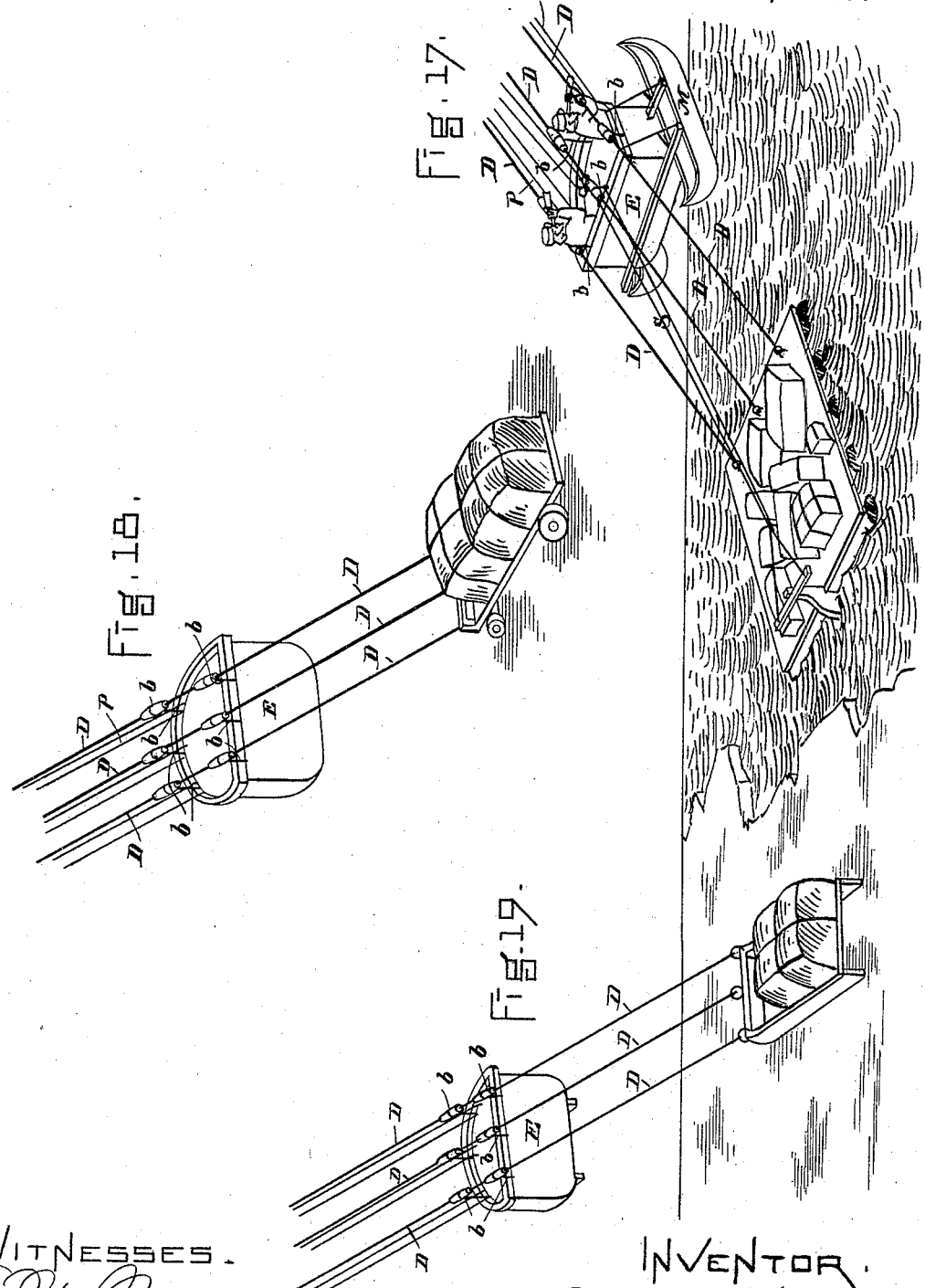

(No Model.) 10 Sheets—Sheet 10.
D. THAYER.
AERIAL APPARATUS.

No. 417,755. Patented Dec. 24, 1889.

Witnesses:
Henry Marsh.
Harry W. Aiken.

Inventor:
David Thayer
By F. E. Teschemacher
Atty.

UNITED STATES PATENT OFFICE.

DAVID THAYER, OF BOSTON, MASSACHUSETTS.

AERIAL APPARATUS.

SPECIFICATION forming part of Letters Patent No. 417,755, dated December 24, 1889.

Application filed July 22, 1889. Serial No. 318,290. (No model.)

*To all whom it may concern:*

Be it known that I, DAVID THAYER, a citizen of the United States, residing at Boston, in the county of Suffolk and State of Massachusetts, have invented an Improved Aerial Apparatus for Navigating the Air and for Towing Vessels and Vehicles Over Water and Land, of which the following is a full, clear, and exact description, reference being had to the accompanying drawings, making part of this specification, in which—

Figure 1 is a view of my improved aerial apparatus, illustrating the same as it will appear in actual use. Fig. 2 is a plan view, enlarged, of the system of aero-planes or kites illustrated in Fig. 1, said kites being inclined at the angle which they assume when in the air. Fig. 3 is a side elevation of my system of kites. Fig. 4 is a side view of one of the "pilot-kites" and its sustaining-balloon. Fig. 5 is a horizontal section of one of the tiers or rows of connected kites. Fig. 6 is a horizontal section of the same, representing the manner in which the right and left hand kites are inclined at the desired angles to the main or central kite of the tier by means of their controlling ropes or braces. Fig. 7 is a horizontal section on the line x x of Fig. 8. Fig. 8 is a front elevation of the upper or pilot kites and their sustaining-balloons; Figs. 9 and 10, details illustrating devices by which the kites are linked or hinged together at the sides. Fig. 11 is a front elevation of one of the lower or draft kites, illustrating the weighting and steadying device by means of which the lower end of the kite is depressed and kept down. Fig. 12 is a rear elevation of the same. Fig. 13 is a vertical section of the same. Fig. 14 is a horizontal section of the same. Fig. 15 is a view illustrating my improved aerial apparatus attached to a vessel for the purpose of towing the same. Fig. 16 is a view of my improved aerial apparatus, illustrating its use in carrying life-lines from the shore to a stranded vessel. Figs. 17, 18, 19, and 20 are views illustrating modifications of my invention.

My invention relates to an aerial apparatus of novel construction, by means of which a car or carriage, together with its appurtenances, passengers, instruments, and appliances, may be sustained at any convenient elevation in the air and moved onward through the same from place to place, as desired, said apparatus being also adapted for towing or moving vessels and vehicles over water, land, and ice.

To this end my invention consists in an aerial apparatus comprising a series of aeroplanes or kites suitably connected and provided with draft-ropes, the lower ends of which are secured to a suitable drag, clog, or retarding device, which serves to keep the said draft-ropes approximately taut or strained as tightly as is desirable, in combination with a car or carriage for containing the voyagers, &c., which is attached to and suspended from said draft-ropes at any convenient elevation above the surface of the water, land, or ice over which the apparatus is traveling, suitable controlling ropes or braces connected with the right and left hand kites of the series being provided, by means of which they can be flexed or inclined to the right or left in order to change the course or direction of motion of the apparatus, as may be desired.

My invention also consists in the combination, with the said series of aero-planes or kites, of one or more balloons, preferably attached to the uppermost kites of the series, for the purpose of sustaining the same and preventing them from dropping into the water or onto the land in case of the failure of the wind; and my invention furthermore consists in certain novel combinations of parts and details of construction, as hereinafter more particularly set forth, and specifically pointed out in the claims.

In the said drawings, A B C, Fig. 1, represent a series or system of aero-planes or kites, which, when in the air, are arranged in horizontal rows, one row slightly above and in advance of the other, as seen in Figs. 1 and 2. These kites are provided with suitable draft-ropes D, which are secured thereto, as hereinafter described, and fastened at their lower ends to a drag or clog, whereby a sufficient amount of tension is maintained to keep them strained as tightly as is desired. When the kites are traveling over a body of water, this clog or retarding device will consist of any suitable floating object of sufficient weight to maintain the required tension on the draft-ropes—as, for instance, a boat or a series of boats G, having preferably attached thereto logs or portions of trees, as represented in Fig. 1, or a heavy float or raft, as shown in Fig. 17; but if the apparatus is to pass over land or ice a drag or sledge, as represented in Figs. 18 and 19, would be employed to maintain a sufficient tension upon the draft-ropes D. From these draft-ropes D, at any convenient and suitable elevation, is hung or suspended, by means of ropes $b$ or otherwise, a car or carriage E for containing the voyagers, together with their supplies, luggage, and other impedimenta, the said car or carriage being carried or wafted through the air as rapidly as the onward movement of the kites will permit, and being kept from descending into the water by the tension on the draft-ropes D, from which it is suspended.

The fastening device by means of which the car or carriage is secured to the draft-ropes D may be made movable and adjustable thereon, and be provided with suitable means for clamping the said car or carriage securely in place when adjusted in the desired position upon said draft-ropes, so that if in the course of the voyage it is found that the car is fastened to the draft-ropes too low down, or so near the water that the roughness of the waves causes seasickness, the car can be easily drawn up farther from the water and nearer to the kites, where the motion of the sea will be felt much less, and consequently the seasickness will be cured or prevented.

The car can be thus drawn up by means of halyards $a$ and pulleys $a'$, made fast to the draft-ropes at any suitable point above the car, as seen in Fig. 1.

The kites A B C are all preferably of the same dimensions, and are constructed in the following manner: The frame $c$ is of oblong form, and is preferably made of small spruce or hackmatack poles about two inches in diameter, (more or less,) braced at the corners for additional strength. This frame is covered with any suitable material $d$, impervious to air and water—as, for instance, water-proof paper, varnished cloth, or rubber tissue. To properly support this covering $d$ and form a strong backing therefor, to enable it to withstand the force of the wind and to prevent it from presenting too great a concavity, the frame $c$ is provided with a lacing $e$, composed of rope or other suitable material, which passes through eyes or around the poles of the frame in such manner as to form a net-work, as seen in Figs. 2 and 12, the meshes of which may be made of any desired size, according to the requirements of the case. If it should be desired to give additional strength to this backing, the frame $c$ may be filled up with bamboo poles, secured thereto in any suitable manner, and arranged parallel to each other, or crossed to form wicker-work, as preferred. Three of these kites are linked or hinged together side by side, as seen in Figs. 2, 5, 6 and 8, to form one of the tiers or horizontal rows shown in Figs. 1 and 2; but a larger number may be linked together in a row, if desired, and any desired number of these tiers or rows of kites may be employed as the weight of the car and the persons and impedimenta to be carried therein may require. The said kites may be connected or pivoted together by rope links $f$, tied near the upper and lower ends of the frame, as seen in Figs. 8 and 9, or they may be connected—like the leaves of a screen—by means of metal straps or plates $g$, Fig. 10, or in any other suitable manner. Transversely across the back of each kite, a little above the center and secured by bolts or otherwise, is a cross-bar H, to which, at the center of its length, is fastened, by means of an eyebolt $h$ or otherwise, one of the draft ropes or lines D. From each of the four corners of the kite and from the center of each side a guy-rope $k$ extends to the draft-rope, to which it is firmly secured, the said guy-ropes supporting, bracing, and balancing the kite in such manner that it will receive upon its inferior concave and oblique surface the force of the wind which sustains it and keeps it aloft. It is essential that each aero-plane or kite shall be so constructed that the oblique impact of the wind shall always be received upon a concave surface.

The three uppermost aero-planes or kites A floating abreast, which I term "pilot-kites," are each provided with a balloon K, of any suitable form and size, secured thereto on the upper side by fastening its lower end to the cross-bar H, or in any other suitable manner. These balloons are of sufficient size and capacity to sustain the pilot-kites A in the air, ready at all times to receive the impact of the wind, said pilot-kites forming the nucleus or main portion of the system to which the remainder of the kites are attached, both while at rest and in active operation. If desired, a balloon or balloons may be attached to the kites of the lower rows as well as to the upper or pilot kites.

The second and third tiers or rows of kites B C, I term "draft-kites," and these may be increased by the addition of other rows of draft-kites, if desired. Each of the kites is steadied by means of a small weight I, suspended from its lower edge. This weight is preferably a metallic ball having a hole through its center to enable it to be easily secured upon a cord $m$, looped from one lower corner of the kite to the other. This weight serves to steady and balance the kite and keep its lower edge depressed, and serves the same purpose as the tail of an ordinary toy kite.

The right and left hand kites of each row or tier have secured to the ends of their cross-bars H ropes or braces $p$, which extend down to the car E, as seen in Fig. 1, whereby, when the apparatus is moving before the wind, its course or direction may be readily changed by pulling on the port or starboard braces, which causes the kites connected therewith to assume an angular position with respect to the central kites of the system, as seen in Fig. 6, so that the wind will impinge on them in such manner as to impel them onward in the desired direction, and thus change the direction of motion and the course of the voyage. The several cross-bars H of a row of kites are hinged together at $q$ $q$, to allow of this angular movement of the outside kites with respect to the central kite, by means of the braces $p$, as described, and, if desired, a single rigid bar L may be secured to the back of each of the central kites a little above the bar H, as seen in Figs. 7 and 8, said bar L being made of sufficient length to extend across the backs of the two side kites, and thus form a rigid stop against which they will rest when in the position seen in Fig. 8, which will thus prevent them from being carried backward out of the plane of the central kite, which it is desirable to avoid.

The car or carriage E may be constructed in a form somewhat resembling a boat, and may have attached to its bottom or sides canoes M, as seen in Fig. 1, which, in case of an accident resulting from the dropping of the car or carriage into the water, would impart additional buoyancy thereto and enable the voyagers to reach the boats G being towed by the draft-ropes or other object at a distance from the car. These boats G are to be heavily loaded with the belongings, supplies, &c., of the persons occupying the car or carriage E; but if the voyage is to be a short one, and no supplies or luggage are to be carried, the boat or boats can be loaded with sufficient ballast to render the draft-ropes D sufficiently taut to keep the car or carriage E suspended in the air, the safety of the voyagers depending on a proper tension of the draft-ropes being at all times maintained.

With the above-described system of kites the drag-boats or retarding device being well freighted and the draft-kites well adjusted and trimmed before a stiff breeze great headway can be made without danger.

In sailing in and out of harbors where small vessels are numerous and where there is danger of collision between them and the drag or retarding device it will be necessary to employ steering apparatus attached to the latter under the control of the voyagers in the car, which may be accomplished by providing tiller-ropes S, leading from the rudder-yoke of the drag-boats to the car, as seen in Fig. 1.

It is obvious that the above-described system of kites may be used to advantage in towing a boat or a vessel, as seen in Fig. 15, where it is not desirable to employ a car or carriage E; and it is also evident that the said aerial apparatus may be used to travel over land where there are level plains of great extent, and over ice, in which case the draft-ropes would be secured to a drag, as seen in Fig. 18, or a sledge, as seen in Fig. 19, of sufficient weight to produce the required tension upon the draft-ropes to keep the car or carriage at the desired elevation.

If it should be desired to check the progress of the apparatus during the voyage over water, land, or ice, the entire system of kites may be turned edge to the wind by manipulating the braces $p$, as before described, when the kites will descend by their own weight against the buoyancy of the balloons K, which will keep the pilot-kites A up out of the water or above the land in a position to again take the wind when desired, the buoyancy of the balloons being so calculated as to be just sufficient to accomplish this purpose, and when the kites are down in this position they can be easily reached for repairs, in case such should be required. When it is desired to again raise the kites to renew the voyage, they are turned by means of the braces $p$ into a position to receive the full force of the wind, when they will rise, one tier or row after the other, until they assume their proper position aloft, as seen in Fig. 1. This method of lowering the entire series of kites by turning them edge to the wind by means of the braces $p$ will be employed to prevent them from being carried away or wrecked in case a gale of great violence should be encountered or seen to be approaching. The descent of the kites against the buoyancy of the balloons K will also take place if the wind should die away; but, as above described, the balloons will retain the pilot-kites in a position ready to take the wind as soon as it again commences to blow, when the apparatus will be in readiness to continue the voyage without any further delay.

The above-described apparatus, when properly constructed on scientific principles, will be capable of transporting persons over water, land, and ice, and may be found of great utility in scientific explorations—as, for instance, in the arctic regions, where large bodies of ice are to be traversed in attempts to reach otherwise inaccessible localities.

In Fig. 16 is illustrated the application of my improved aerial apparatus to the life-saving service. In this case a number of life-lines $r$ are attached to the cross-bars H of the several tiers of kites, after which the apparatus is carried out from the shore by the force of the wind, and its course or direction regulated, by means of the braces $p$, until it is over the stranded vessel, when the life-lines will be brought within reach of the persons on board, and can then be used to establish a communication between the shore and the stranded vessel.

In addition to the halyards $a$ and pulleys $a'$ for drawing the car farther up from the water, as hereinbefore described, a sail or kite T may be employed, as represented in Fig. 20, as an auxiliary device, which sail or kite is to be made fast at its lower end to the car, and is preferably secured to the draft-ropes by means of rings $b'$, which run or slide upon said ropes, the opposite or free end of said sail or kite having halyards $c'$ secured thereto, by means of which it can be raised into a position to take the wind, and by this device the force of the wind may be advantageously employed in cases of emergency, where it is desired to draw the car up farther from the surface of the water with as little delay as possible. When said sail or kite is not in use for the above-named purpose, it may rest upon the draft-ropes as a cover to the car to protect the same from the rain and from the fierce rays of the sun, and in case the car should be too heavily laden the free end of the kite or sail may be elevated a little, so as to be able to take the wind, and thereby help support the car.

What I claim as my invention, and desire to secure by Letters Patent, is—

1. An aerial apparatus for navigating the air, consisting of a series of aero-planes or kites connected together and provided with draft-ropes, a clog or drag attached to the lower ends of the draft-ropes to maintain a constant tension thereon, and a car or carriage attached to and suspended from said draft-ropes and adapted to be carried or wafted thereby through the air above the level of the water, land, or ice over which it is passing, substantially as set forth.

2. In an aerial apparatus of the character described, the combination of a series of aero-planes or kites connected together and provided with draft-ropes, a clog or drag attached to said draft-ropes to maintain a constant tension thereon, a car or carriage suspended from said draft-ropes and made movable thereon, and a tackle whereby the car can be moved toward and from the kites to vary its height above the level of the water, land, or ice over which it is passing, substantially as set forth.

3. In an aerial apparatus of the character described, the combination of a series of aero-planes or kites arranged in a horizontal row and pivoted or hinged together, as described, said kites being provided with draft-ropes, a clog or drag attached to the lower ends of said draft-ropes and acting to maintain a constant tension thereon, a car or carriage attached to and suspended from said draft-ropes, and controlling ropes or braces extending from said car or carriage to the two outer or side kites of the row, whereby they can be turned or inclined at an angle to the central kite, to which they are hinged, substantially as and for the purpose described.

4. In an aerial apparatus of the character described, a system of aero-planes or kites arranged in horizontal rows or tiers, one slightly above and beyond the other, said kites being provided with guy-ropes $k$ and draft-ropes D, the latter attached at their lower ends to a clog or drag, in combination with a car or carriage suspended from said draft-ropes, and controlling ropes or braces attached to the right and left hand kites of the system, all operating substantially in the manner and for the purpose set forth.

5. In an aerial apparatus of the character described, the combination, with a horizontal row of kites provided with draft-ropes D and hinged or pivoted together, as described, of the cross-bars H, hinged together at $q$ and having the controlling ropes or braces $p$, attached to the outer ends of the outer cross-bars, substantially as and for the purpose set forth.

6. In an aerial apparatus of the character described, the combination, with a horizontal row of kites hinged or pivoted together, as described, and having the cross-bars H, secured thereto and hinged together at $q$, and provided with braces $p$, attached to the outer ends of the outer cross-bars, of the rigid bar L, secured to the upper side of the central kite and forming a rest or stop for the right and left hand kites hinged thereto when said braces are slackened, substantially as set forth.

7. In an aerial apparatus of the character described, the combination of an aero-plane or kite provided with a draft-rope attached to a clog or drag, a car or carriage attached to and suspended from said draft-rope, and a balloon secured to said kite and adapted to sustain the same in a position to receive the force of the wind, substantially as described.

8. In an aerial apparatus of the character described, the combination, with a series of connected kites arranged in rows or tiers, as described, and provided with draft-ropes, a clog or drag attached to the lower ends of said draft-ropes, and a car or carriage attached to and suspended from said draft-ropes, of balloons attached to the upper tier of kites and adapted to sustain the same above the water, land, or ice in a position to receive the force of the wind, substantially as set forth.

9. In an aerial apparatus of the character described, the combination, with the kite-frame $c$ and its covering $d$, of the lacing $e$, adapted to form a backing for said covering, substantially as set forth.

Witness my hand this 19th day of July, A. D. 1889.

DAVID THAYER.

In presence of—
P. E. TESCHEMACHER,
G. D. RUSSELL.